US010328509B2

(12) United States Patent
Friedrich et al.

(10) Patent No.: US 10,328,509 B2
(45) Date of Patent: Jun. 25, 2019

(54) THERMAL DEBURRING MACHINE HAVING A MOVABLE SUPPORTING ASSEMBLY

(71) Applicant: Robert Bosch GmbH, Stuttgart (DE)

(72) Inventors: Boris Friedrich, Stuttgart (DE); Ruediger Finn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 15/026,017

(22) PCT Filed: Sep. 18, 2014

(86) PCT No.: PCT/EP2014/069856
§ 371 (c)(1),
(2) Date: Mar. 30, 2016

(87) PCT Pub. No.: WO2015/044017
PCT Pub. Date: Apr. 2, 2015

(65) Prior Publication Data
US 2016/0214192 A1    Jul. 28, 2016

(30) Foreign Application Priority Data

Sep. 30, 2013  (DE) .................. 10 2013 219 677

(51) Int. Cl.
*B23D 79/00*  (2006.01)
(52) U.S. Cl.
CPC .................. *B23D 79/005* (2013.01)
(58) Field of Classification Search
CPC .................................................. B23D 79/005
(Continued)

(56) References Cited

U.S. PATENT DOCUMENTS

| 3,992,138 | A  | * | 11/1976 | Leisner ............... | B23D 79/005 432/162 |
| 7,425,298 | B2 | * | 9/2008  | La Gala ............... | B23D 79/005 266/252 |
| 8,202,473 | B2 | * | 6/2012  | Pellerito ............. | B23D 79/005 148/200 |

FOREIGN PATENT DOCUMENTS

| DE | 24 40 040 A |   | 3/1776 |             |
| DE | 3333343     | * | 3/1985 | ........... B23D 79/005 |

(Continued)

OTHER PUBLICATIONS

DE 3333343, Conrad et al., Device for treating workpiece by means of temperature and pressure surges, Mar. 28, 1985, English machine translation version, By Espacenet, 5 pages.*

(Continued)

*Primary Examiner* — Scott R Kastler
*Assistant Examiner* — Michael Aboagye
(74) *Attorney, Agent, or Firm* — Maginot, Moore & Beck LLP

(57) ABSTRACT

A thermal deburring machine includes a first chamber part, a second chamber part, a closing device, at least one supporting assembly. The second chamber part is separate from the first chamber part, and the first and second chamber parts are configured to receive workpieces to be deburred. The closing device is configured to push the second chamber part and first chamber part together with respect to a closing direction. The supporting assembly is disposed in an annular manner about a transverse axis oriented perpendicularly to the closing direction, is movable relative to the closing device along the transverse axis, and is configured to absorb closing forces from the closing device.

20 Claims, 11 Drawing Sheets

(58) Field of Classification Search
USPC ........ 266/48, 49, 50, 51, 249; 148/200, 202,
148/194; 29/33 A
See application file for complete search history.

(56) References Cited

FOREIGN PATENT DOCUMENTS

| | | |
|---|---|---|
| EP | 1 693 137 A2 | 8/2006 |
| EP | 1 837 111 A2 | 9/2007 |
| RU | 1785853 A1 | 1/1993 |
| SU | 729258 A1 | 4/1980 |
| SU | 1655679 A2 | 6/1991 |
| WO | 2010/027908 A2 | 3/2010 |

OTHER PUBLICATIONS

International Search Report corresponding to PCT Application No. PCT/EP2014/069856, dated Dec. 2, 2014 (German and English language document) (7 pages).

\* cited by examiner

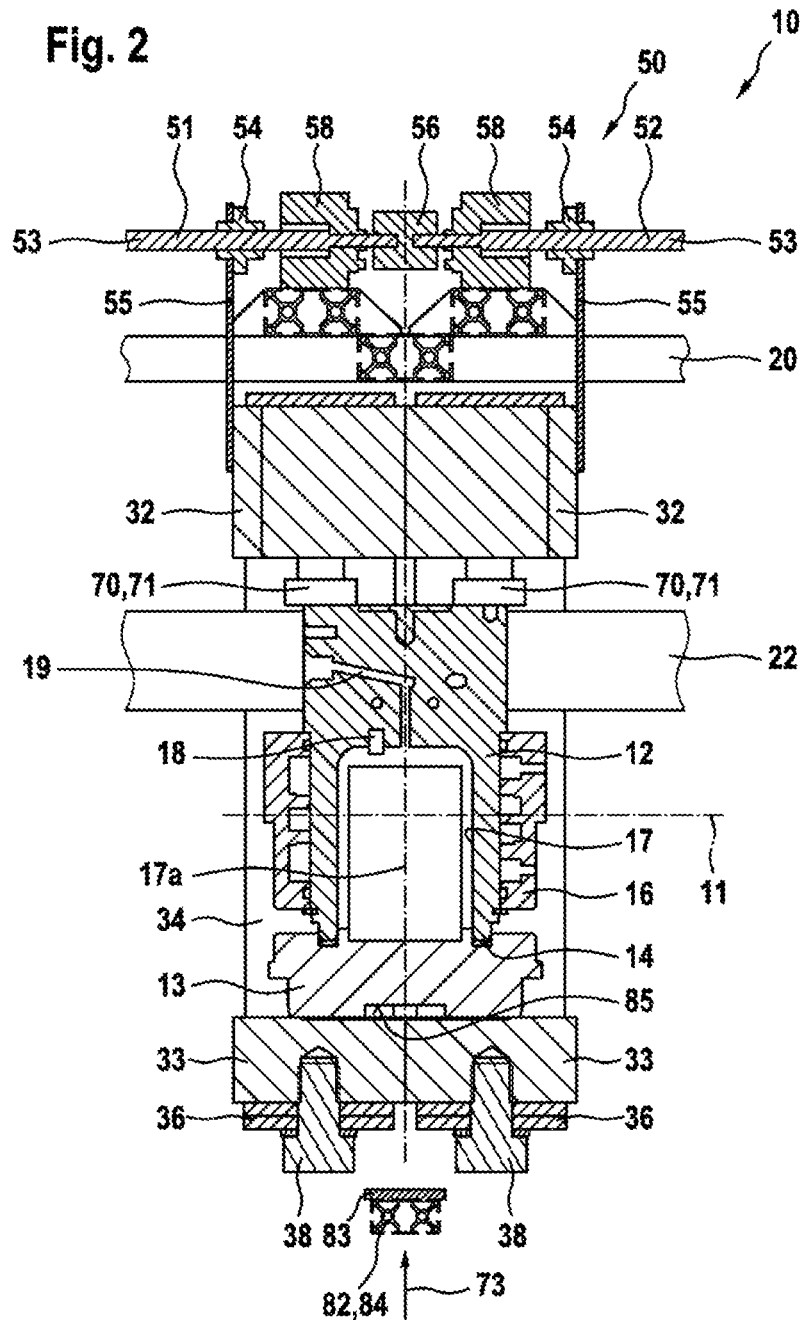

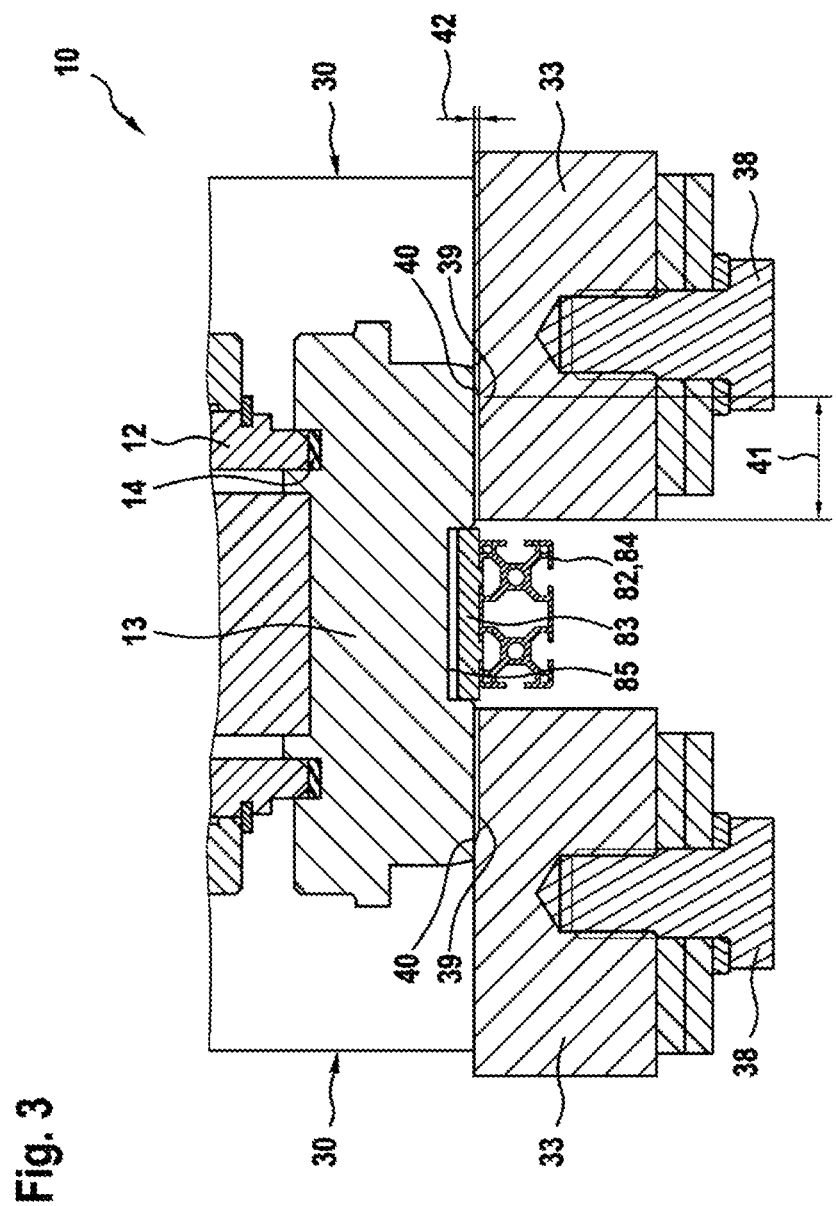

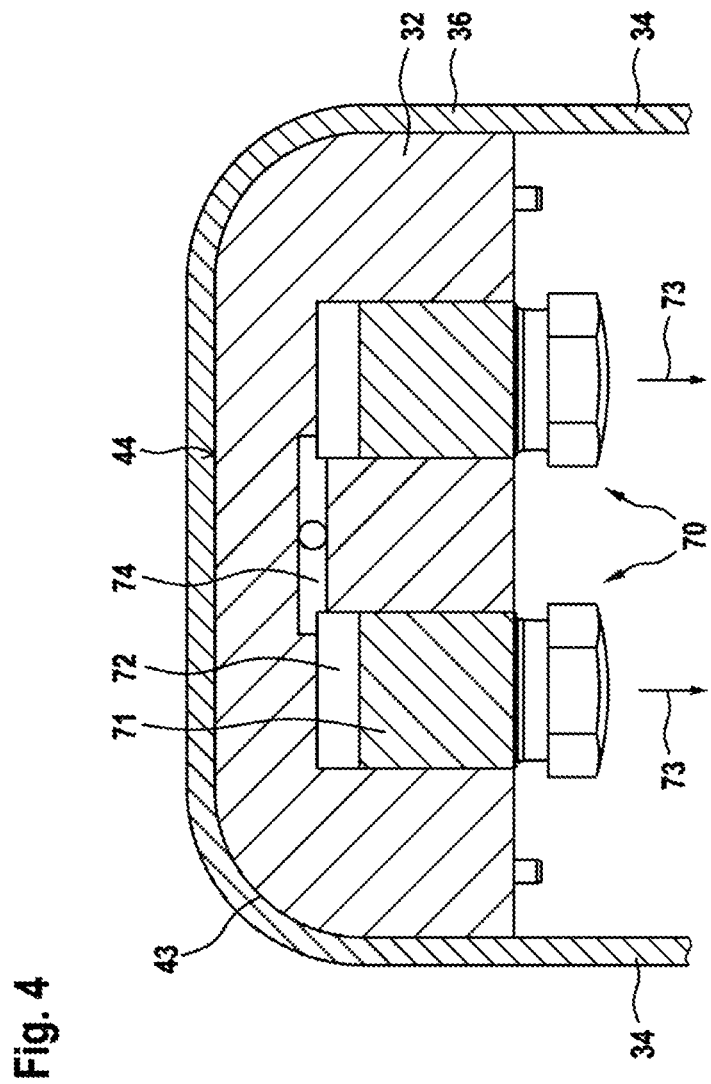

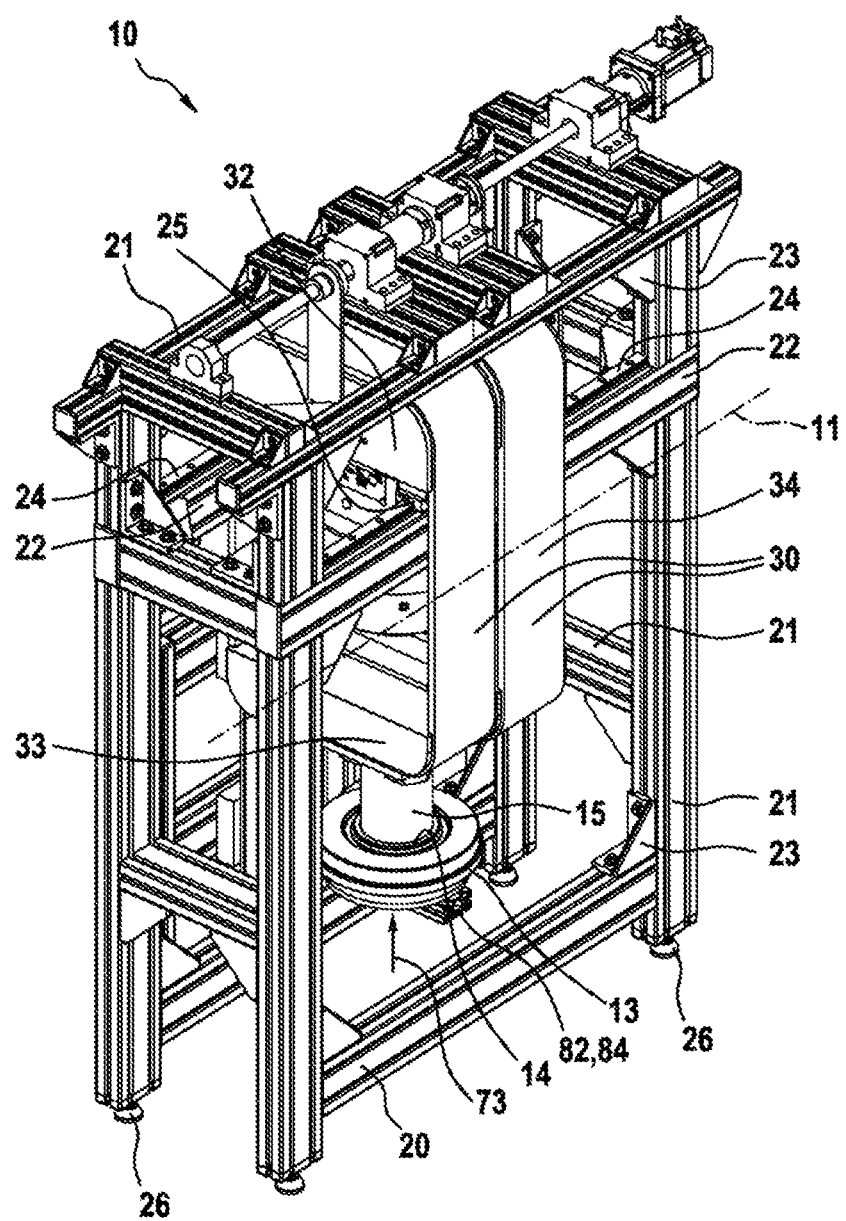

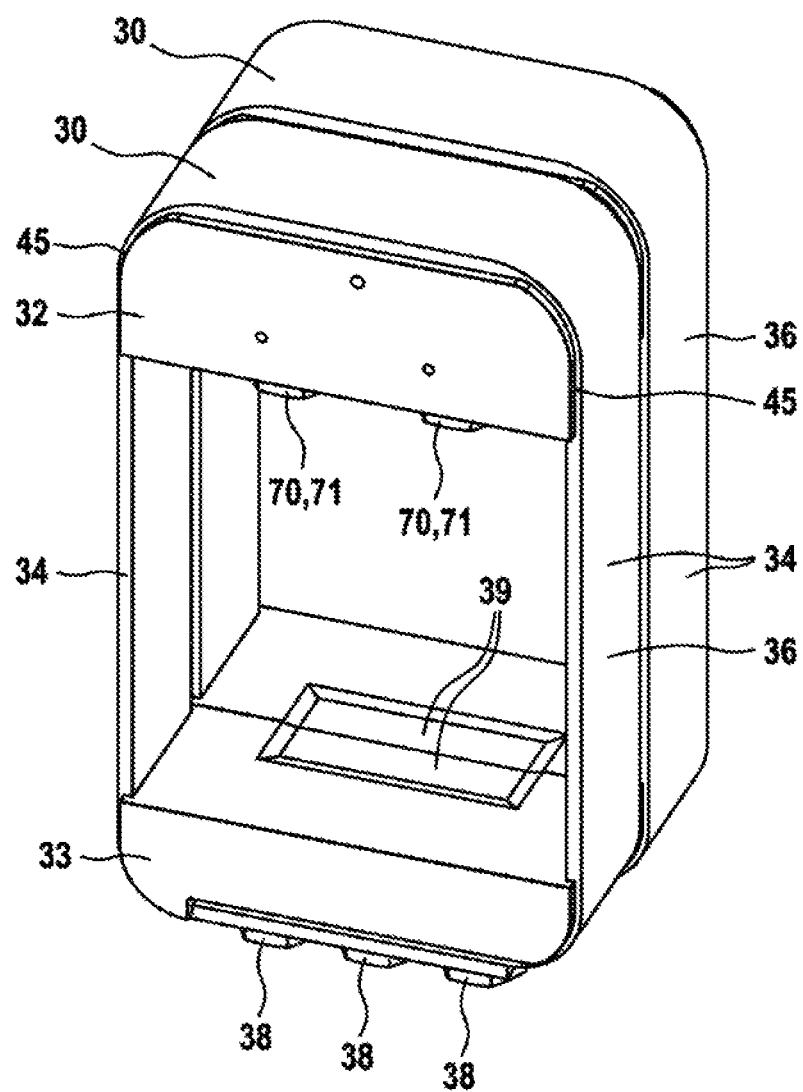

THERMAL DEBURRING MACHINE HAVING A MOVABLE SUPPORTING ASSEMBLY

This application is a 35 U.S.C. § 371 National Stage Application of PCT/EP2014/069856, filed on Sep. 18, 2014, which claims the benefit of priority to Ser. No. DE 10 2013 219 677.6, filed on Sep. 30, 2013 in Germany, the disclosures of which are incorporated herein by reference in their entirety.

BACKGROUND

The disclosure relates in particular to a thermal deburring machine. The present disclosure, however, can also be applied for other machines, in particular presses, injection molding machines, and die casting machines.

A thermal deburring machine is known from EP 1 693 137 B1. The deburring machine comprises a first and a second chamber part. A cavity for receiving the workpieces to be deburred is provided in the first chamber part. The second chamber part is provided in the form of a plate, which is connected to a closing device. By means of the closing device, the second chamber part can be pushed against the first chamber part with respect to a closing direction in order to close the deburring chamber in a gas-tight manner. Mention should also be made of the third chamber part, which is arranged on the first chamber part, opposite the second chamber part, wherein said third chamber part is substantially identical to the second chamber part. The third chamber part, however, could equally be formed in one piece in the first chamber part. The first chamber part can be removed from the thermal deburring machine in the direction of a transverse axis, which is oriented perpendicularly to the closing direction, in order to fill the deburring machine with workpieces to be deburred.

The chamber parts are surrounded annularly by a supporting assembly, which consists of a first and a second support, which are each provided in the form of a plate and which are fixedly interconnected via a total of four tie rods. When the deburring chamber is closed, the closing device is supported on the supporting assembly. The supporting device also absorbs the gas pressure forces created by the explosion of the combustion gas inside the deburring chamber. The supporting assembly is accordingly very solidly built.

SUMMARY

The problem addressed by the disclosure lies in providing a particularly material-saving and compact thermal deburring machine. In addition, the thermal deburring machine should do without small drives for moving the movable parts.

In one embodiment, this problem is solved in that the at least one supporting assembly is movable relative to the closing device transversely to the closing direction. Accordingly, it is no longer the heavy first chamber part that is moved relative to the closing device, but instead the at least one supporting assembly. As will be presented hereinafter, this can save a great amount of material. Accordingly, the drives for moving the supporting assembly can also be made small. The at least one supporting assembly is preferably movable linearly. The supporting assembly, however, may also be moved over any other path, provided the movement is performed transversely to the closing direction, which will be explained in greater detail with reference to FIGS. 9a to 9c.

Advantageous developments and improvements of the disclosure are specified in the claims.

At least two, preferably precisely two, supporting assemblies can be provided which are movable relative to one another transversely to the closing direction. The supporting assemblies are advantageously moved in opposite directions during operation of the thermal deburring machine, so that the mass forces caused by the movement counterbalance one another. Accordingly, the frame of the thermal deburring machine can be set in vibration by the movement of the supporting assemblies. A particularly solid embodiment of the frame is not necessary.

The at least one supporting assembly may have a first and a second rigid support, which are interconnected via at least two tie rods, such that a closed ring is produced. The first and the second support are preferably wider than the first and the second chamber part. If a plurality of supporting assemblies are used, this is preferably true for all supporting assemblies. The distance between the first and the second support in the closing direction is preferably greater than the sum of the heights of the first and second chamber part.

The at least one supporting assembly may have a higher bending stiffness in the direction of the transverse axis than perpendicular to the transverse axis. The high rigidity in the direction of the transverse axis means that the supporting assembly does not vibrate or hardly vibrates during movement thereof. The lower rigidity perpendicularly to the transverse axis causes a uniform distribution of load in the supporting assembly, wherein stress peaks are avoided. Accordingly, the components of the supporting assembly can be made smaller, thus saving material.

The closing device can be arranged in or on the first support. The closing device is preferably arranged within the first support in order to save installation space. The closing device preferably comprises at least one hydraulic cylinder in the case of high closing forces. With smaller closing forces at least one electric drive can also be provided, which for example comprises a ball screw or a planetary screw drive. If a number of drives are provided, these are preferably coupled in terms of movement, such that they move synchronously.

The at least two tie rods can be formed by a common sheet metal part, which is bent, starting from a flat plate of constant thickness, so as to form a ring. The corresponding tie rods have a high strength and rigidity with low material use. The fastening of the proposed sheet metal part to the first and to the second support is also particularly simple. The sheet metal part preferably consists of steel. A straight flat steel is preferably bent to form a substantially rectangular ring which has rounded corners. Material stresses in the sheet metal part are thus minimized, wherein at the same time the span of the first and of the second support decreases, such that the load thereof is also lower. The supports are preferably adapted substantially without play to the inner shape of the sheet metal. The width of the flat steel in the direction of the transverse axis is preferably between 4 and 12 times as great as the thickness thereof perpendicular to the transverse axis.

The sheet metal part may have two ends, which are interconnected using separate connection means, wherein the connection means are preferably screws. The screws preferably pass through the overlapping ends of the sheet metal part, wherein said screws are screwed into the second support.

A frame may be provided, having at least one transverse support which passes through the at least one supporting assembly in the direction of the transverse axis. The thermal deburring machine is to be placed on the supporting surface by means of the frame. The frame may be composed for example of extruded aluminum profiles. However, steel supports or steel sheets can also be used, which for example are welded to one another and/or are screwed to one another.

At least one guide rail may be fastened to the at least one transverse support, the at least one supporting assembly, preferably the first support thereof, being movably guided on said guide rail in the direction of the transverse axis. The guide is accordingly arranged very close to the center of gravity of the at least one supporting assembly, such that vibrations, in particular bending vibrations, of the supporting assembly during movement thereof are minimized.

The first chamber part can be fixedly connected to the transverse support, wherein the first chamber part has a cavity for receiving the workpieces to be deburred, wherein the second chamber part is formed such that it can form a closed-off cavity together with the first chamber part. Accordingly, the chamber part that is supported by the closing device is the heavier chamber part. The other, second chamber part is preferably formed in a plate-like manner, wherein it may also have a small cavity. In particular, the second chamber part is lighter than the first chamber part so that it can be easily moved in order to fill the cavity forming the deburring chamber.

The closing device can be arranged on the side of the at least one transverse support facing away from the first chamber part, wherein said closing device is supported on said transverse support or on the first chamber part. In particular, the force of the weight of the at least one supporting assembly and of the first chamber part is to be supported hereby on the transverse support in a space-saving manner. Here, it should be noted that the closing device is preferably supported directly on the first chamber part, wherein the first chamber part is fixedly screwed to the at least one transverse support.

Precisely two supporting assemblies may be provided, wherein a linear drive is provided, which is designed to move the two supporting assemblies at the same time in opposite directions. The aforementioned compensation of the mass forces during the movement of the supporting assemblies is thus achieved in a particularly simple manner.

A lifting device can be provided, by means of which the second chamber part can be moved at least in the closing direction. The second chamber part is to be removed from the first chamber part and returned thereto again by means of the lifting device, so that said workpieces to be deburred can be loaded into or removed from said second chamber part.

The second chamber part may preferably be grasped by the at least one supporting assembly by moving said supporting assembly in the direction of the transverse axis. The force of the weight of the second chamber part is hereby taken up by the at least one supporting assembly. Here, the second chamber part preferably rests loosely on the aforementioned lifting device so that it can be lifted thereby. Two supporting assemblies are preferably provided in order to grasp the second chamber part.

The second support may have an indentation adapted to the second chamber part. Here, the second support preferably only contacts the second chamber part when this is located at least partially below said support. The contact surface between the second support and the second chamber part is preferably defined by the shape of the indentation, such that the closing force is introduced centrally into the tie rods. Particularly lower stresses are thus produced in the tie rods, such that these can be formed with small dimensions.

BRIEF DESCRIPTION OF THE DRAWINGS

The disclosure will be explained in greater detail hereinafter on the basis of the accompanying drawings, in which:

FIG. 2 shows a partial sectional view of the thermal deburring machine according to the disclosure with closed deburring chamber;

FIG. 3 shows a partial sectional view of the thermal deburring machine according to the disclosure, wherein the supporting assemblies are located in a middle position;

FIG. 4 shows a sectional view of the first support with the closing device;

FIG. 5 shows a perspective view of a thermal deburring machine according to the disclosure;

FIG. 6a shows a perspective view of two mirror-image supporting assemblies according to FIG. 6;

DETAILED DESCRIPTION

Figure 1:
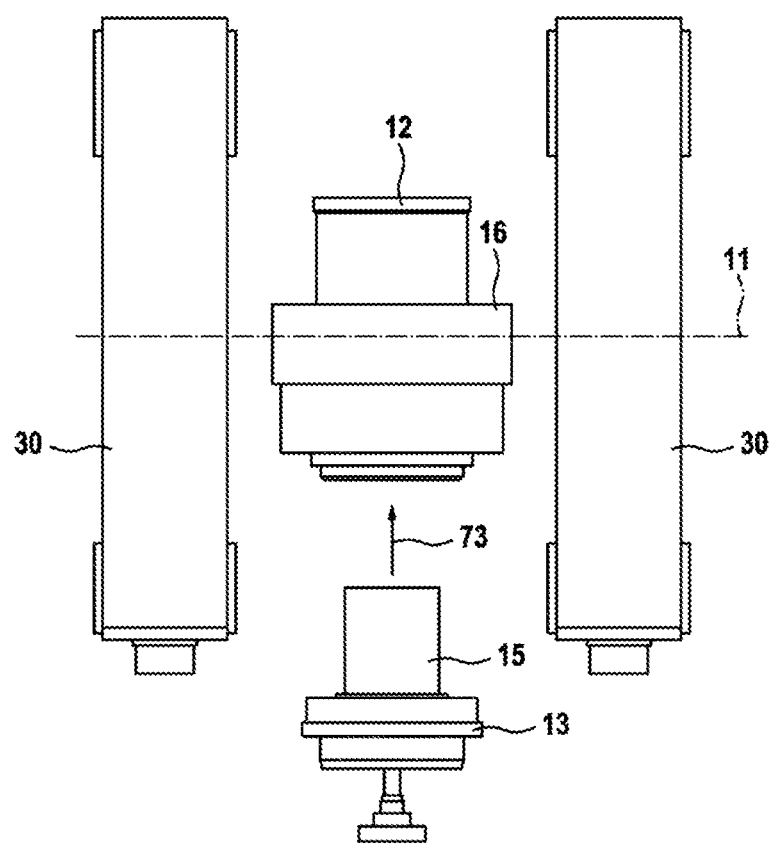
FIG. 1 shows a side view of the supporting assemblies and the chamber parts with opened deburring chamber.
Figure 5A:
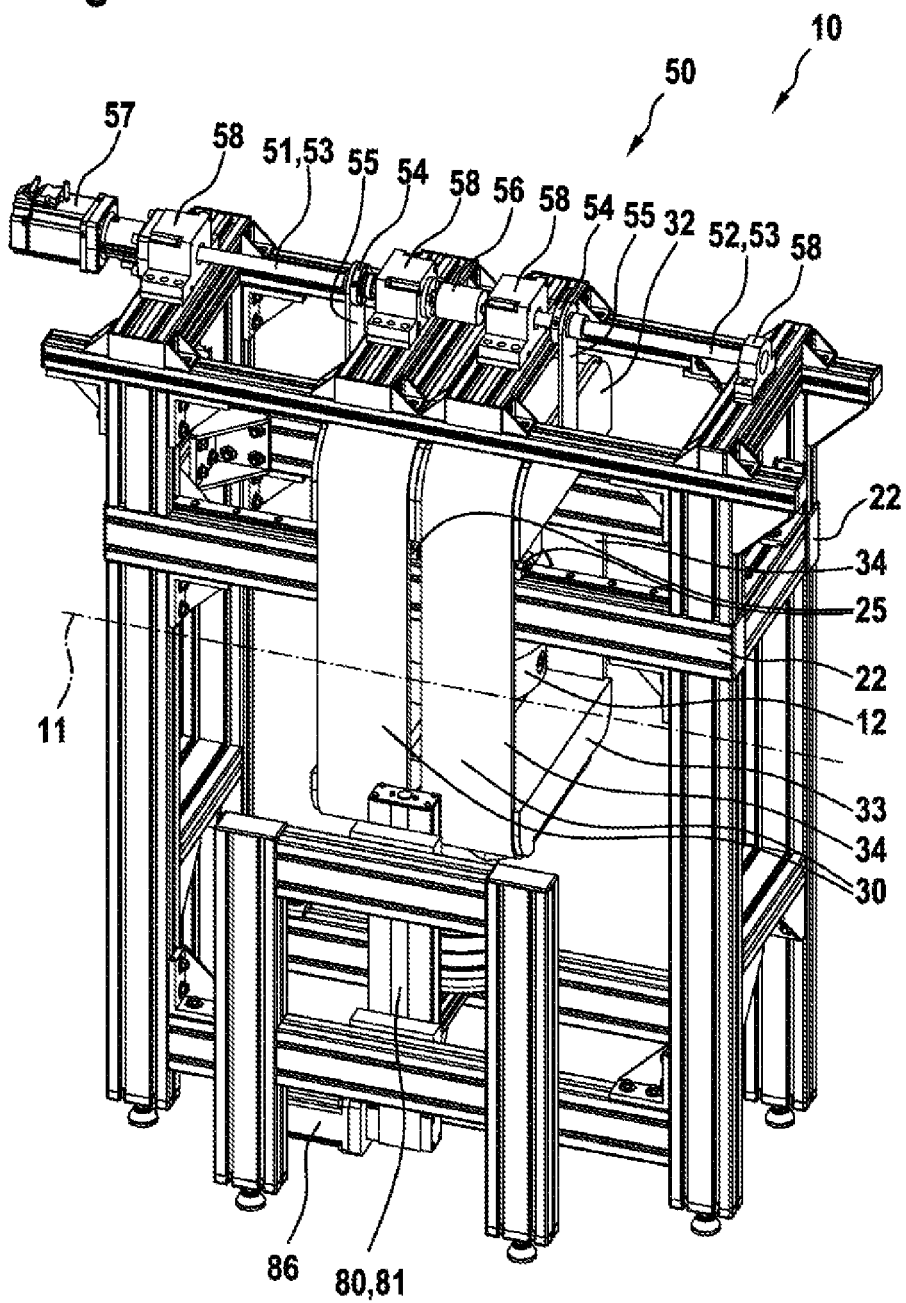
FIG. 5a shows the thermal deburring machine according to FIG. 5 from another viewing direction.

FIG. 1 shows a side view of the supporting assemblies 30 and of the chamber parts 12; 13 with open deburring chamber. The remaining parts of the thermal deburring machine are not illustrated for the sake of clarity. Reference is made in this respect to FIGS. 5 and 5a, which show the complete machine.

The first chamber part 12 is substantially cylindrical and consists of steel so that it can withstand the explosion pressure. Inside, there is a cavity, which can receive the workpiece 15. The workpiece 15 is illustrated purely by way of example as a cylinder. Any workpieces made of metal or plastic can be processed using the thermal deburring machine according to the disclosure, wherein a plurality of workpieces can be processed simultaneously. The first chamber part 12 is surrounded by a cooling jacket 16, through which a cooling liquid, for example water, can flow in order to dissipate the explosion heat.

The workpiece or workpieces 15 is/are positioned loosely on the second chamber part 13 for loading of the thermal deburring machine. The second chamber part 13 is substantially plate-like and likewise consists of steel. Once the second chamber part 13 has been loaded, this is moved upwardly using the lifting device (no. 80; FIG. 5a) in the closing direction 73 until it bears against the stationary first chamber part 12. This movement is preferably performed over a controlled path, for example by means of an end switch for the second chamber part or by means of a path measurement system on the lifting device. The aforementioned movement in principle may have any path form. It is merely necessary for the second chamber part 13 to be freely accessible for loading at the start of the movement, wherein said second chamber part bears against the first chamber part 12 at the end of the movement.

During the loading, the two supporting devices 30 are moved to the side in the direction of the transverse axis 11, so that they do not hinder the movement of the second chamber part 13. Here, the transverse axis 11 extends perpendicularly to the closing direction 73, wherein the closing direction 73 is defined by the direction of movement of the closing device illustrated in FIG. 4. In the case of thermal deburring machines having low operating pressures and small volumes of the deburring chamber, it is also possible for just a single supporting device 30 to be provided.

FIG. 2 shows a partial sectional view of the thermal deburring machine 10 according to the disclosure with closed deburring chamber 17, wherein the plane of section contains the central axis 17a of the deburring chamber 17 and the transverse axis 11. The supporting assemblies 30 are located here in the position in which they can absorb the explosion forces, i.e. in a position in which they are arranged at the shortest possible distance.

The deburring chamber 17 is preferably formed by a cavity, which is substantially circular-cylindrical with respect to the central axis 17a, which preferably extends parallel to the closing direction 73. A combustible gas mixture can be filled via a gas supply channel 19 into the deburring chamber 17, wherein the filling pressure by way of example is between 5 bar and 25 bar. This gas mixture is made to explode using the (highly schematically illustrated) ignition plug 18, whereby the pressure in the deburring chamber rises, for example by a factor of 17. As a result of this explosion, machining burrs are removed from the workpiece 15. The first and the second chamber part 12; 13 are held together against the explosion pressure by means of the supporting assemblies 30, such that the deburring chamber remains closed in a pressure-tight manner. The supporting assemblies 30 are exposed here to very high loads. Reference should also be made at this juncture to the seal 14 between the first and the second chamber part 12; 13, which seal can be formed in accordance with EP 1 837 111 B1, for example.

The two supporting assemblies 30 are rotated relative to one another through 180° with mirror symmetry. They each comprise a first and a second rigid support 32; 33, which are held together by tie rods 34. The tie rods 34 may be formed here optionally by the sheet metal part 36 illustrated in the present case or by the separate tie rods illustrated in FIG. 7. Both embodiments have the common feature that the supporting assemblies 30 have a high bending stiffness with respect to a load in the direction of the transverse axis 11, such that they do not vibrate during the closing movement. Perpendicularly to the transverse direction 11, they have a low rigidity, such that the forces in the supporting assembly 30 are distributed uniformly.

The second chamber part 13 rests on the two second supports 33. The first chamber part 12 is fixedly connected to the transverse supports 21, which are preferably fastened to the peripheral surface of the first chamber part 12. In the first support 32 there is arranged the closing device 70, of which both piston rods 71 move in the closing direction 73. The piston rods 71 are preferably supported here directly on the first chamber part 12. When the piston rods 71 are extended, the first support 32 in FIG. 2 moves upwardly. The second support 33 follows this movement via the tie rods 34, such that the second chamber part 13 is pushed against the first chamber part 12 until the seal 14 is tightly closed.

In FIG. 2 the lifting table 82 of the lifting device can be seen, which lifting table is located below the support assemblies 30 in the closed state of the thermal deburring machine 10. The lifting table 82 comprises an extension arm 84, which for example can be provided in the form of an extruded aluminum profile. A centering disk 83 is fastened to the free end of the extension arm 84 and by way of example may be provided in the form of a circular plate. The second chamber part 13 has an adapted centering recess 85, by means of which it rests loosely on the centering disk 83 as the thermal deburring machine is loaded.

In FIG. 2 the linear drive 50 can also be seen, by means of which the supporting assemblies 30 are set in motion. Instead of the screw drives 51; 52 illustrated in the present case, any other linear drive, for example a toothed belt drive, can be used. In contrast to the illustration, the linear drive 50 is preferably encapsulated, such that it is protected against ambient influences.

The two supporting assemblies 30 are simultaneously moved in opposite directions by means of the linear drive 50, so that the effective mass forces acting on the frame 20 during the movement of said supporting assemblies are low. For this purpose, a first and a second screw drive 51; 52 are provided, of which the threaded spindles 53 have opposite pitch directions. The two threaded spindles 53 are interconnected for conjoint rotation via a coupling 56, such that they move synchronously. In the present case the threaded spindle 53 of the first screw drive 51 is driven by a motor (no. 57 in FIG. 5), in particular an electric motor. A bearing block 58 is arranged at each of the two ends of the threaded spindles 53, in which bearing block the assigned threaded spindle is rotatably mounted, preferably via a radial rolling bearing. The bearing blocks 58 are fixedly connected to the frame 20. Both threaded spindles 53 are in screwed engagement with an assigned nut 54, which is preferably formed as a recirculating ball nut. The nuts 54 are coupled in terms of movement to an assigned supporting assembly 30 via an assigned coupling part 55, which for example is plate-like. The supporting assemblies 30 are accordingly set in linear motion when the threaded spindles 53 are set in rotation.

FIG. 3 shows a partial sectional view of the thermal deburring machine 10 according to the disclosure, wherein the supporting assemblies 30 are located in a middle position. The plane of section is the same as in FIG. 2.

So that the second supports 33 of the supporting assemblies 30 can be moved without difficulty below the second chamber part 13, they are each provided with a recess 39, which ends in the middle region of the second support 33 by means of an insertion bevel 40. The depth 42 of the recess 39 is selected to be of such a size that there is some play between the recess 39 and the second chamber part 13 once this has been brought by the lifting device into abutment with the first chamber part 12. The supporting assemblies 30 can thus be moved toward one another without this movement being disturbed at the beginning by the second chamber part 13. Only when the insertion bevel 40 comes into contact with the second chamber part 13 is there a small amount of friction between the second chamber part 13 and the supporting assemblies 30. Once the supporting assemblies 30 have been fully driven together, the closing device is actuated. The seal 14 is thus compressed, such that it closes completely tight, even under the action of the explosion pressure.

In the state shown in FIG. 3, in which the second chamber part 13, apart from the recess 39, rests slightly on the second support 33, the lifting table 82 is moved down, wherein the supporting assemblies 30 are then moved into their end position, in which they are arranged at the shortest possible distance. The length 41 of the recess 39 is selected here to be of such a size that the force transferred from the second chamber part 13 to the second support 33 acts centrally on the second support 33 in question, such that a bending load of the tie rods 34 is avoided.

FIG. 4 shows a sectional view of the first support 32 with the closing device 70. The first support 32 preferably consists of steel and on the upper side has a planar support surface 44, on which the sheet metal part 36 rests, which forms the tie rod 34. The sheet metal part 36 also rests on a rounded portion 43 on the first support 32, which transitions without steps and kinks into the support surface 44. The rounded portions 43 are intended to minimize the load of the sheet metal part 36. The form described above is provided identically at the second support. The first and/or the second support 32; 33 can be composed from one or more parts.

The closing device 70 is housed inside the first support 32 and comprises piston rods 71, which are movable in the closing direction 73. In the present case, two piston rods 71 are illustrated, wherein more or fewer piston rods 71 can be provided depending on the size of the thermal deburring machine. It should be noted that the closing device 70 in the present case comprises a total of four piston rods 71, specifically two for each of the two first supports 32.

The piston rods 71 are driven hydraulically in the present case. For this purpose, they are received in a linearly movable manner in a circular-cylindrical cylinder space 72, which is adapted with very little play to the piston rods 71. The cylinder space 72 can be supplied with pressurized fluid, in particular hydraulic oil, via the fluid channels 74, such that the piston rods 71 extend in the closing direction 73. The return of the piston rods 71, which for example can be implemented by means of a spring or hydraulically, is not shown.

Instead of the hydraulic drive of the piston rods 71, an electric drive can also be provided, for example with a screw drive, in particular with a planetary screw drive.

FIG. 5 shows a perspective view of a thermal deburring machine 10 according to the disclosure, wherein FIG. 5a shows the same thermal deburring machine 10 from a different viewing direction.

The frame 20 of the thermal deburring machine 10, which is composed of a multiplicity of frame supports 21, which are fixedly interconnected via connection brackets 23, can be seen. The frame supports 21 are formed in the present case as extruded aluminum profiles. However, the frame 20 is preferably produced from steel. Height-adjustable feet 26, via which the frame 20 stands on the supporting surface, are provided on the frame 20.

The frame 20 in the present case comprises two transverse supports 22, which extend in the direction of the transverse axis 11, wherein they pass through the supporting assemblies 30. A guide rail 24 is fastened at the top on each of the transverse supports 22, on which guide rails a plurality of guide carriages are supported in a linearly movable manner, preferably with use of recirculating rolling elements. The guide carriages 25 are each fastened to an underside of an associated first support 32, such that the first supports 32 are guided in a linearly movable manner in the direction of the transverse axis 11.

The lifting device 80, which comprises a linear module 81, which for example can be embodied in accordance with DE 197 38 988 B4, is additionally fastened to the frame 20. Said module comprises a table part, which can be set in a linear motion, which is oriented parallel to the closing direction 73, using an electric motor 86. The aforementioned extension arm 84 is fastened to the table part.

Figure 6:
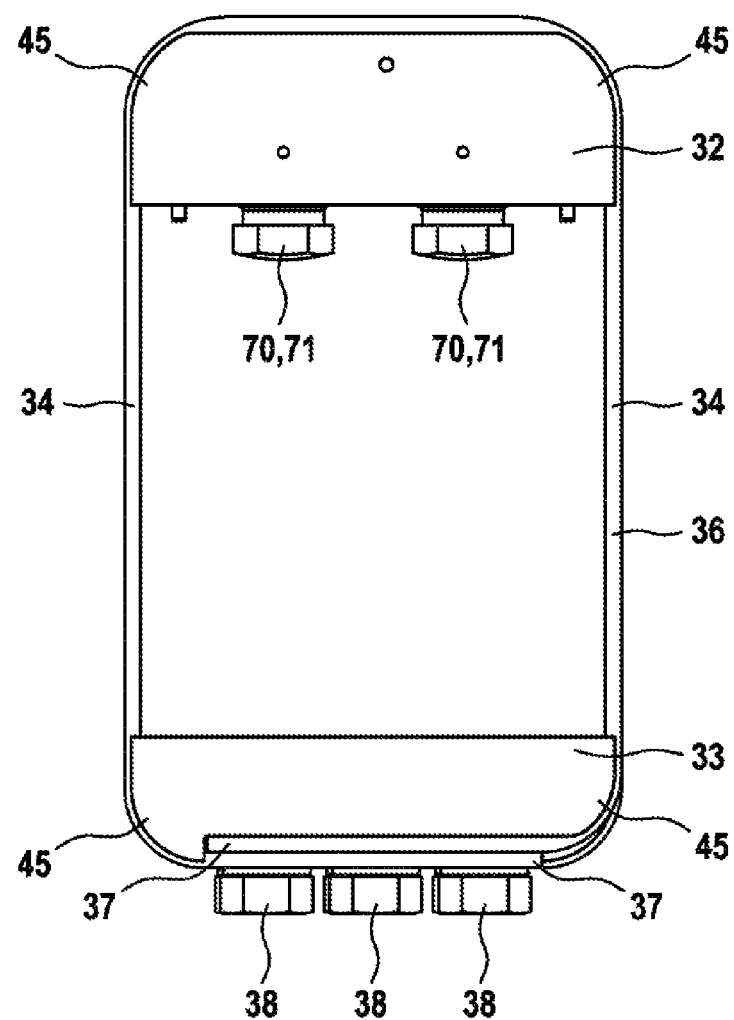
FIG. 6 shows a front view of the supporting assembly of the thermal deburring machine according to FIG. 5.

FIG. 6 shows a front view of the supporting assembly of the thermal deburring machine according to FIG. 5.

The two tie rods 34, between which the first and the second chamber part are arranged, are formed by a common sheet metal part 36. This is bent, preferably starting from a flat steel, i.e. a planar plate of constant thickness, to form a rectangular ring. This is adapted to the shape of the first and second support, such that it rests over its entire area on the supporting surfaces and rounded portions (no. 43; 44 in FIG. 4) of said supports. Side guides 45 are provided on the first and the second support 32; 33 in the region of the rounded portions, such that the sheet metal part 36 cannot slip down from the first and the second support 32; 33 in the viewing direction of FIG. 6.

The two ends 37 of the sheet metal part 36 overlap one another, wherein they are penetrated by, for example, three screws 38, which are screwed into the second support 33, which is illustrated in greater detail in FIG. 2.

FIG. 6a shows a perspective view of two mirror-image supporting assemblies 30 according to FIG. 6. Alternatively, two identical supporting assemblies 30 can also be used, which are rotated through 180° relative to one another with respect to the closing direction. The rectangular shape of the aforementioned recess 39 can be seen in the two second supports 33, which produce the contact with the second chamber part. Reference is made in this respect to the comments made in relation to FIG. 3.

Figure 7:
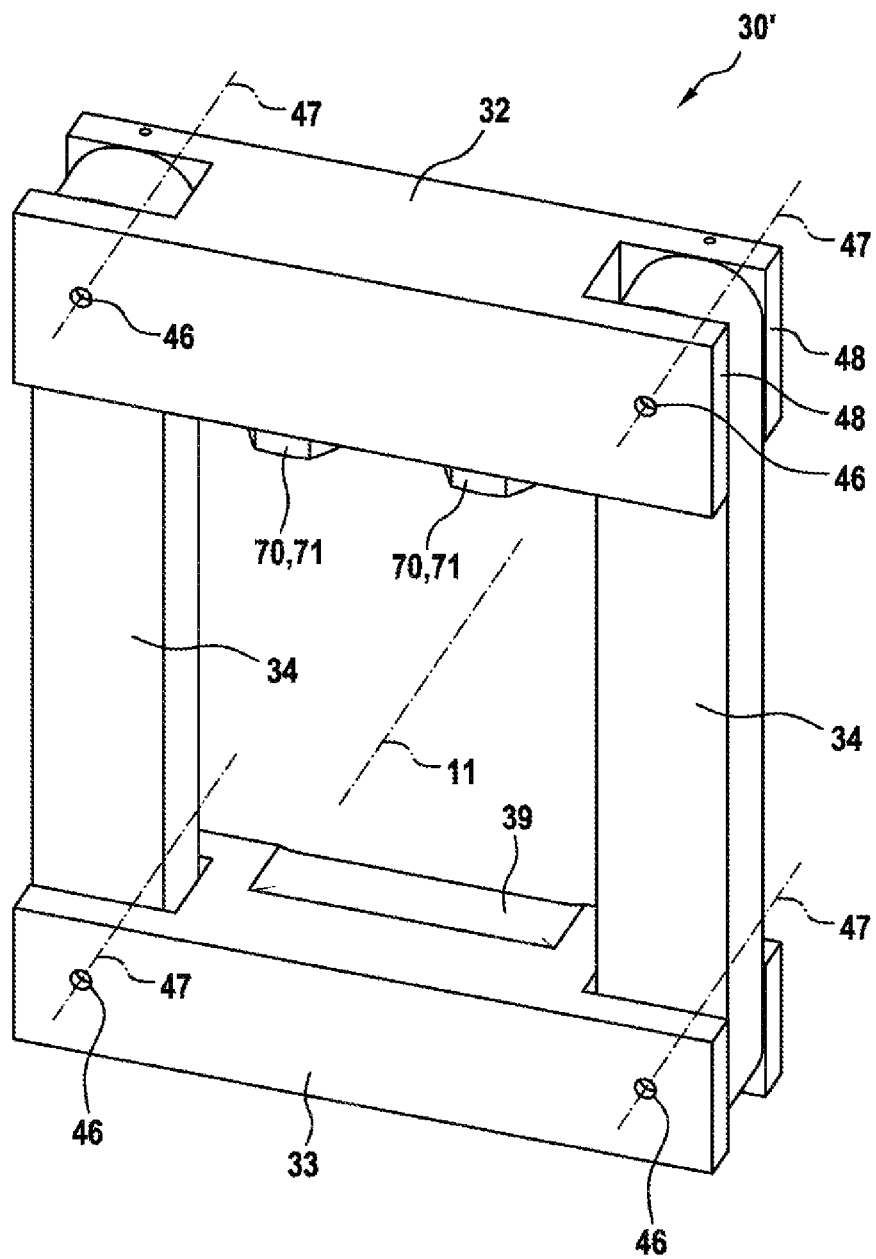
FIG. 7 shows a perspective view of a second embodiment 30' of the supporting assembly.

FIG. 7 shows a second embodiment 30' of the supporting assembly. This can be used in the thermal deburring machine according to FIG. 5 instead of the first embodiment 30.

Instead of the sheet metal part, two separate tie rods 34 are provided, which are connected at their two ends to the first and the second support 32; 33 via swivel joints 46. In addition, the first and the second support 32; 33 are identical to the first embodiment of the supporting assembly, such that reference can be made in this respect to the comments provided above.

The axes of rotation 47 of the four swivel joints 46 are parallel to one another and extend parallel to the transverse axis 11. Accordingly, the second embodiment 30' of the supporting assembly has a high bending stiffness in the direction of the transverse axis 11, wherein it is freely movable perpendicularly thereto. The associated advantages have already been discussed above.

The axes of rotation 47 are each defined by a circular-cylindrical bolt (not visible), which penetrates the two fork legs 48 at the first and at the second support 32; 33 and penetrates the associated tie rod 34. The aforementioned bolt is subject to shear load at two locations in the present exemplary embodiment. Reference is therefore made to a swivel joint 46 in double shear.

Figure 8:
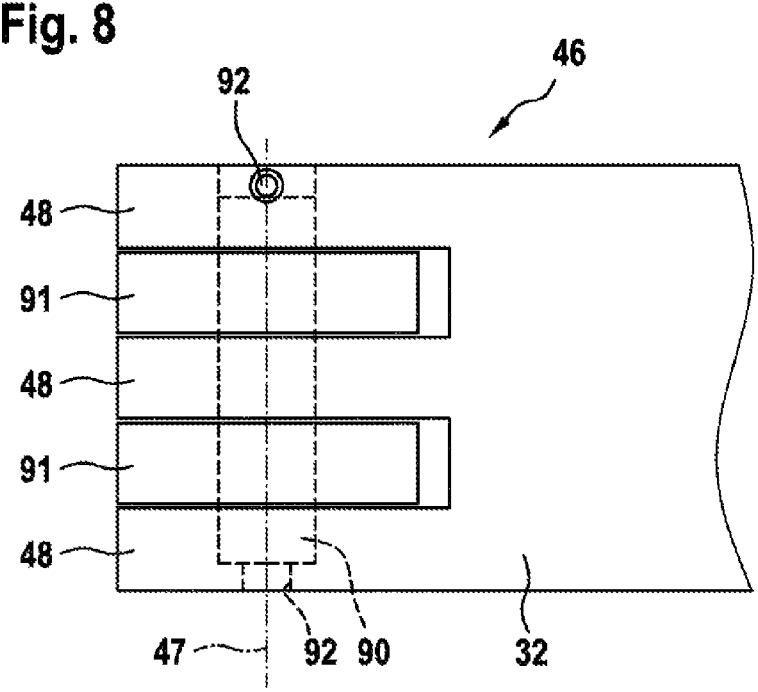
FIG. 8 shows a plan view of a swivel joint in quadruple shear.

FIG. 8, by contrast, shows a swivel joint 46 in quadruple shear, in which the bolt 90 is subject to shear load at four locations, such that the swivel joint 46 can transfer greater forces. Here, a total of three or more fork legs 48 are provided at the first support 32 or at the second support 33, wherein, between these, there are arranged fork legs 91 of the tie rod. The bolt 90 passes through all fork legs 48, 91.

At one end, the bolt 90 is secured by a stepped bore 92 against a change in position in the direction of the axis of rotation 47. At the opposite end, a securing screw 92 with recessed head and sleeve nut is provided for this purpose.

Figure 9A:
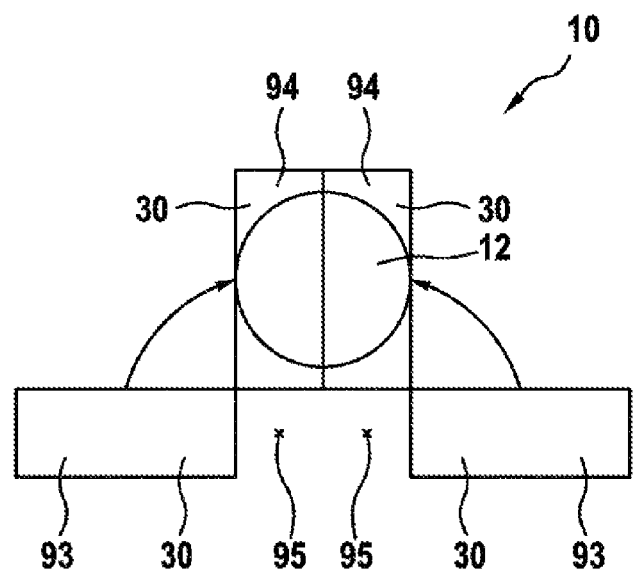
FIG. 9a shows a highly schematic illustration of a first path of the supporting assemblies.

FIG. 9a shows a highly schematic illustration of a first half of the supporting assemblies 30. The position of the stationary first deburring chamber 12 is indicated by a circle.

The positions 93; 94 of the supporting assemblies 30 in the open and in the closed position are indicated in each case by a rectangle, wherein two supporting assemblies 30 are used in the present case.

In the embodiment according to FIG. 9*a* the supporting assemblies 30 are each movable in rotation with respect to a center of rotation 95, wherein the centers of rotation 95 are arranged on the same side of the first deburring chamber 12.

Figure 9B:
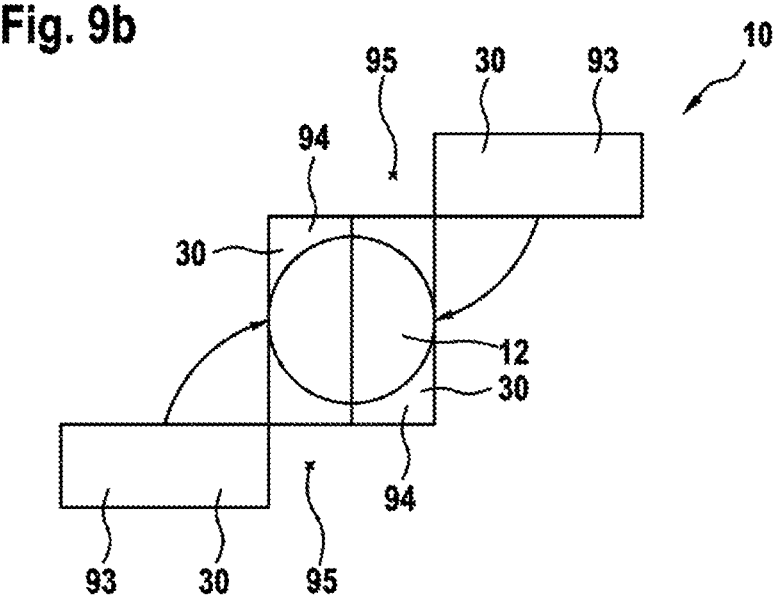
FIG. 9b shows a highly schematic illustration of a second path of the supporting assemblies.

FIG. 9*b* shows an illustration similar to FIG. 9*a*. The sole difference lies in the fact that the centers of rotation 95 are arranged diagonally opposite in relation to the first deburring chamber 12.

Figure 9C:
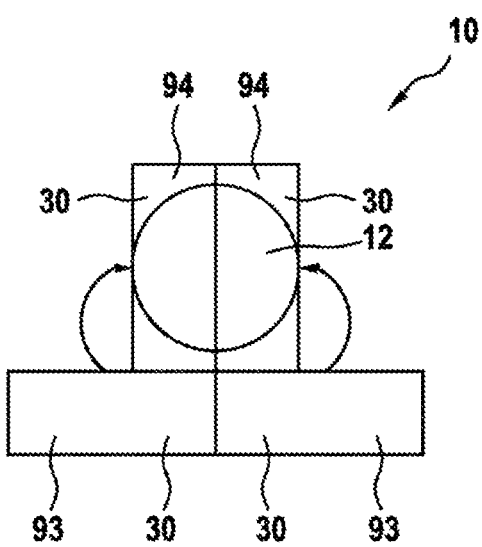
FIG. 9c shows a highly schematic illustration of a second path of the supporting assemblies.

FIG. 9*c* shows an illustration similar to FIG. 9*a*. The sole difference lies in the fact that the circular rotational movement has been replaced by an arbitrarily curved movement, such that the two supporting assemblies 30 in the open position 93 bear directly against one another or are arranged at a short distance from one another. As a result, the overall width of the thermal deburring machine 10 is reduced.

The shown movement path can be implemented by way of example by means of a four-bar linkage.

LIST OF REFERENCE SIGNS 10 thermal deburring machine
11 transverse axis
12 first chamber part
13 second chamber part
14 seal
15 workpiece
16 cooling ring
17 cavity or deburring chamber
17*a* central axis of the deburring chamber
18 ignition plug
19 gas supply channel
20 frame
21 frame support
22 transverse support
23 connection bracket
24 guide rail
25 guide carriage
26 foot
30 supporting assembly (first embodiment)
30' supporting assembly (second embodiment)
32 first support
33 second support
34 tie rod
36 sheet metal part
37 end of the sheet metal part
38 connection means
39 indentation (on the second support)
10 insertion bevel
41 length of the recess
42 depth of the recess
43 rounded portion
44 support surface
45 side guide
46 swivel joint
47 axis of rotation
48 fork leg
50 linear drive
51 first screw drive
52 second screw drive
53 threaded spindle
54 nut
55 coupling part
56 coupling
57 motor
58 bearing block
70 closing device
71 piston rod
72 cylinder space
73 closing direction
74 fluid channel
80 lifting device
81 linear module
82 lifting table
83 centering disk
84 extension arm
85 centering recess
86 electric motor
90 bolt
91 fork leg on the tie rod
92 stepped bore
93 open position of the supporting assembly
94 closed position of the supporting assembly
95 center of rotation
35

The invention claimed is:

1. A machine, comprising:
    a first part;
    a second part separate from the first part;
    a closing device configured to push the first part against the second part or push the second part against the first part, with respect to a closing direction; and
    at least one supporting assembly including a plurality of supports interconnected to form a closed ring that encircles a transverse axis oriented perpendicularly to the closing direction, the at least one supporting assembly movable relative to the first and second parts transversely to the closing direction and configured to absorb closing forces corresponding to the action of the closing device on the first or second part.

2. The thermal deburring machine as claimed in claim 1, wherein the closed ring is one of a closed, annular ring or closed, rectangular ring.

3. A thermal deburring machine comprising:
    a first chamber part;
    a second chamber part separate from the first chamber part, the first and second chamber parts configured to receive workpieces to be deburred;
    a closing device configured to push the first chamber part against the second chamber part or push the second chamber part against the first chamber part with respect to a closing direction; and
    at least one supporting assembly configured to absorb closing forces corresponding to the action of the closing device on the first or second chamber parts, the at least one supporting assembly including a plurality of supports interconnected to form a closed ring that encircles a transverse axis oriented perpendicularly to the closing direction, and the at least one supporting assembly being movable relative to the first and second chamber parts transversely to the closing direction.

4. The thermal deburring machine as claimed in claim 1, further comprising at least two supporting assemblies that are movable relative to each other transversely to the closing direction.

5. The thermal deburring machine as claimed in claim 1, wherein the plurality of supports includes a first rigid and a second rigid support, and wherein the at least one supporting assembly further includes:
    that interconnect the first and second supports.

6. The thermal deburring machine as claimed in claim 5, wherein the at least one supporting assembly has a higher bending stiffness in the direction of the transverse axis than in a direction perpendicular to the transverse axis.

7. The thermal deburring machine as claimed in claim 5, wherein the closing device is arranged in or on the first rigid support.

8. The thermal deburring machine as claimed in claim 5, wherein the at least two tie rods are formed by a common sheet metal part of constant thickness that includes a bend so as to form a ring.

9. The thermal deburring machine as claimed in claim 8, wherein the sheet metal part has two ends, which are interconnected via a separate connection device.

10. The thermal deburring machine as claimed in claim 1, further comprising a frame having at least one transverse support that passes through the at least one supporting assembly in the direction of the transverse axis.

11. The thermal deburring machine as claimed in claim 10, further comprising at least one guide rail fastened to the at least one transverse support, the at least one supporting assembly being movably guided on the at least one guide rail in the direction of the transverse axis.

12. The thermal deburring machine as claimed in claim 10, wherein:
the first chamber part is fixedly connected to the transverse support,
the first chamber part defines a cavity configured to receive the workpieces to be deburred, and
the second chamber part configured to form a closed-off cavity together with the first chamber part.

13. The thermal deburring machine as claimed in claim 10, wherein:
the closing device is arranged on a side of the at least one transverse support facing away from the first chamber part, and
the closing device is supported on said transverse support or on the first chamber part.

14. The thermal deburring machine as claimed in claim 1, further comprising:
precisely two supporting assemblies; and
a linear drive configured to move the two supporting assemblies at the same time in opposite directions.

15. The thermal deburring machine as claimed in claim 14, wherein the linear drive includes:
a first screw drive; and
a second screw drive, the first and second screw drives having opposite pitch directions, and being driven by a common motor.

16. The thermal deburring machine as claimed in claim 1, further comprising a lifting device configured to move the second chamber part at least in the closing direction.

17. The thermal deburring machine as claimed in claim 16, wherein the second chamber part is graspable by the at least one supporting assembly by being moved in the direction of the transverse axis.

18. The thermal deburring machine as claimed in claim 5, wherein the second rigid support has an indentation corresponding to the second chamber part.

19. The thermal deburring machine as claimed in claim 1, wherein the at least one supporting assembly is movable transversely to the closing direction along a path which extends in a straight line or in a curved manner.

20. The thermal deburring machine as claimed in claim 5, wherein the at least two tie rods are formed by two separate tie rods.

* * * * *

UNITED STATES PATENT AND TRADEMARK OFFICE
CERTIFICATE OF CORRECTION

| | | |
|---|---|---|
| PATENT NO. | : 10,328,509 B2 | Page 1 of 1 |
| APPLICATION NO. | : 15/026017 | |
| DATED | : June 25, 2019 | |
| INVENTOR(S) | : Boris Friedrich and Ruediger Finn | |

It is certified that error appears in the above-identified patent and that said Letters Patent is hereby corrected as shown below:

On the Title Page

Item (56) References Cited: "RU 1785853 A1 1/1993" should read --SU 1785853 A1 1/1993--.

In the Claims

Column 10, Line 66 should read: --assembly further includes at least two tie rods--.

Signed and Sealed this
Seventeenth Day of September, 2019

Andrei Iancu
*Director of the United States Patent and Trademark Office*